(12) United States Patent
Kim

(10) Patent No.: US 8,243,641 B2
(45) Date of Patent: Aug. 14, 2012

(54) METHOD AND APPARATUS FOR TRANSMITTING AND RECEIVING SIGNAL IN A WIRELESS COMMUNICATION SYSTEM

(75) Inventor: Young-Ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 12/215,464

(22) Filed: Jun. 26, 2008

(65) Prior Publication Data

US 2009/0003261 A1 Jan. 1, 2009

(30) Foreign Application Priority Data

Jun. 29, 2007 (KR) .......................... 10-2007-0065533

(51) Int. Cl.
*H04B 7/14* (2006.01)
*H04B 17/02* (2006.01)
*H04W 24/00* (2009.01)
*G08C 17/00* (2006.01)

(52) U.S. Cl. ........... 370/311; 370/315; 455/9; 455/11.1; 455/67.11; 455/456.1

(58) Field of Classification Search .................. 370/311, 370/315; 455/9, 11.1, 67.11, 456.1
See application file for complete search history.

(56) References Cited

U.S. PATENT DOCUMENTS

| 6,285,857 | B1 * | 9/2001 | Javitt | 455/15 |
| 6,718,159 | B1 * | 4/2004 | Sato | 455/11.1 |
| 6,946,817 | B2 * | 9/2005 | Fischer et al. | 320/132 |
| 6,954,612 | B2 * | 10/2005 | Cheng et al. | 455/11.1 |
| 7,353,028 | B2 * | 4/2008 | Fukuhara | 455/436 |
| 7,606,182 | B2 | 10/2009 | Park et al. | |
| 7,675,914 | B2 * | 3/2010 | Hamamoto et al. | 370/392 |
| 7,773,941 | B2 * | 8/2010 | Bonta et al. | 455/11.1 |
| 7,852,764 | B2 * | 12/2010 | Yamaguchi et al. | 370/231 |
| 7,860,463 | B2 * | 12/2010 | Kim et al. | 455/69 |
| 2007/0081479 | A1 * | 4/2007 | Kang et al. | 370/310 |
| 2007/0232345 | A1 * | 10/2007 | Taoka | 455/522 |
| 2008/0013459 | A1 * | 1/2008 | Do et al. | 370/248 |
| 2008/0056173 | A1 * | 3/2008 | Watanabe | 370/315 |
| 2009/0073915 | A1 * | 3/2009 | Zhang et al. | 370/315 |
| 2009/0088164 | A1 * | 4/2009 | Shen et al. | 455/436 |
| 2009/0274116 | A1 * | 11/2009 | Cho et al. | 370/331 |

FOREIGN PATENT DOCUMENTS

| KR | 1020040082890 A | 9/2004 |
| KR | 100650114 B1 | 11/2006 |
| KR | 1020070004370 A | 1/2007 |
| KR | 1020070013101 A | 1/2007 |

OTHER PUBLICATIONS

Office Action dated Apr. 29, 2010 in connection with Korean Patent Application No. 10-2007-0065533.

* cited by examiner

*Primary Examiner* — Alpus H Hsu

(57) ABSTRACT

A method and apparatus for transmitting and receiving a signal in a wireless communication system are provided in which, when a relay request message is received from a transmitter, a first receiver transmits a relay response message including a relay possible information to the transmitter, the relay possible information including information indicating whether the first receiver can perform a relay function, and relays a signal between the transmitter and a second receiver, when a relay confirm message is received from the transmitter after transmitting the relay response message. Herein, the first receiver is different from the second receiver.

19 Claims, 5 Drawing Sheets

METHOD AND APPARATUS FOR TRANSMITTING AND RECEIVING SIGNAL IN A WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 29, 2007 and assigned Serial No. 2007-65533, the entire disclosure of which is hereby incorporated by reference.

TECHNICAL FIELD OF THE INVENTION

The present invention generally relates to a method and apparatus for transmitting and receiving a signal in a wireless communication system.

BACKGROUND OF THE INVENTION

Typically, a wireless communication system makes communications between a fixed base station (BS) and a mobile station (MS) using a single direct link, thus having low flexibility in configuring a wireless network. That is, it is difficult to configure a wireless network to provide services in a wireless environment experiencing fluctuating changes in traffic distribution or the number of required calls.

In this context, studies have been conducted on relaying data over multiple hops using relay stations (RSs) in a wireless communication system. The relay service enables the wireless communication system to reconfigure a network quickly according to a communication environment change and to efficiently operate the entire wireless network. Also, the wireless communication system can provide a high-speed radio channel to an MS by establishing an RS between a BS and the MS. Therefore, the use of RSs provides a high-speed data channel to MSs in poor channel conditions at a cell boundary and expands cell coverage.

The configuration of a conventional wireless communication system for providing a relay service will be described below with reference to FIG. 1.

Referring to FIG. 1, in the relay wireless communication system, MSs 140, 150, 160 and 170 (MS1, MS2, MS3 and MS4, respectively) receive services from a BS 100 and RSs 110, 120, and 130 (RS1, RS2 and RS3, respectively).

MS1 and MS2 within a service area 101 of the BS 100 communicate with the BS 100 using direct BS-MS links L1. MS2, which is in poor channel conditions, receives a high-speed data channel using RS-MS link of RS3, L2.

MS3 and MS4 outside the service area 101 of the BS 100 communicate with the BS 100 using RS-MS links of RS1, L3. That is, the BS 100 can expand its service area by providing communication links to MS3 and MS4 outside the service area 101 using RS1. For MS4 that is at a cell boundary of the service area of RS1 and thus in poor channel conditions, transmission capacity can be increased using an RS-MS link of RS2, L4.

As described above, the wireless communication system can expand cell coverage and increase transmission capacity by providing control channels and high-speed data channels to MSs that are located at a cell boundary and in a shadowing area and thus are in poor channel conditions, by use of RSs. The relay service can be supported using neighbor MSs or separately procured RSs for a relay function.

However, when an MS supports the relay function, the MS consumes its limited power to relay a signal for another MS. The resulting power shortage may impede signal processing in the MS.

Conventionally, there was no sufficient motivation to use an MS capable of operating as an RS in relaying a signal for another MS at the expense of its power consumption in a cellular relay service system designed for expanding cell coverage or increasing transmission capacity, and no related procedures were specified.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide a method and system for transmitting and receiving a signal more efficiently by use of an MS equipped with a relay function in a wireless communication system.

In accordance with an aspect of exemplary embodiments of the present invention, a method for transmitting and receiving a signal in a first receiver in a wireless communication system is provided. The method includes transmitting, when a relay request message is received from a transmitter, a relay response message including a relay possible information is transmitted to the transmitter, the relay possible information including information indicating whether the first receiver can perform a relay function, and relaying a signal between the transmitter and a second receiver, when a relay confirm message is received from the transmitter after transmitting the relay response message. Herein, the first receiver is different from the second receiver.

In accordance with another aspect of exemplary embodiments of the present invention, a method for transmitting and receiving a signal in a transmitter in a wireless communication system is provided. The method includes transmitting a relay request message to first receivers capable of performing a relay function among a plurality of receivers, receiving from each of the first receivers a relay response message including relay possible information that includes information indicating whether each of the first receivers can perform a relay function, selecting a second receiver from among the first receivers to perform the relay function using the received relay possible information, transmitting a relay confirm message to the second receiver, and transmitting and receiving signals to and from a third receiver among the plurality of receivers using the second receiver. Herein, the first receiver, the second receiver, and the third receiver are different receivers.

In accordance with a further aspect of exemplary embodiments of the present invention, an apparatus for transmitting and receiving a signal in a wireless communication system is provided. The apparatus includes a first receiver for transmitting, when a relay request message is received from a transmitter, a relay response message including a relay possible information to the transmitter, the relay possible information including information indicating whether the first receiver can perform a relay function, and relaying a signal between the transmitter and a second receiver, when a relay confirm message is received from the transmitter after transmitting the relay response message. Herein, the first receiver is different from the second receiver.

In accordance with still another aspect of exemplary embodiments of the present invention, an apparatus for transmitting and receiving a signal in a wireless communication system is provided. The apparatus includes a transmitter for transmitting a relay request message to first receivers capable of performing a relay function among a plurality of receivers, receiving from each of the first receivers a relay response message including a relay possible information that includes information indicating whether each of the first receivers can perform a relay function, selecting a second receiver from among the first receivers to perform the relay function using the received relay possible information, transmitting a relay confirm message to the second receiver, and transmitting and receiving signals to and from a third receiver among the plurality of receivers using the second receiver. Herein, the first receiver, the second receiver, and the third receiver are different receivers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method for supporting a relay service using an MS in a multi-hop relay wireless communication system. The MS can be any mobile device that can provide a communication service, such as a portable phone, a laptop, a personal digital assistant (PDA), and so forth.

Figure 1:
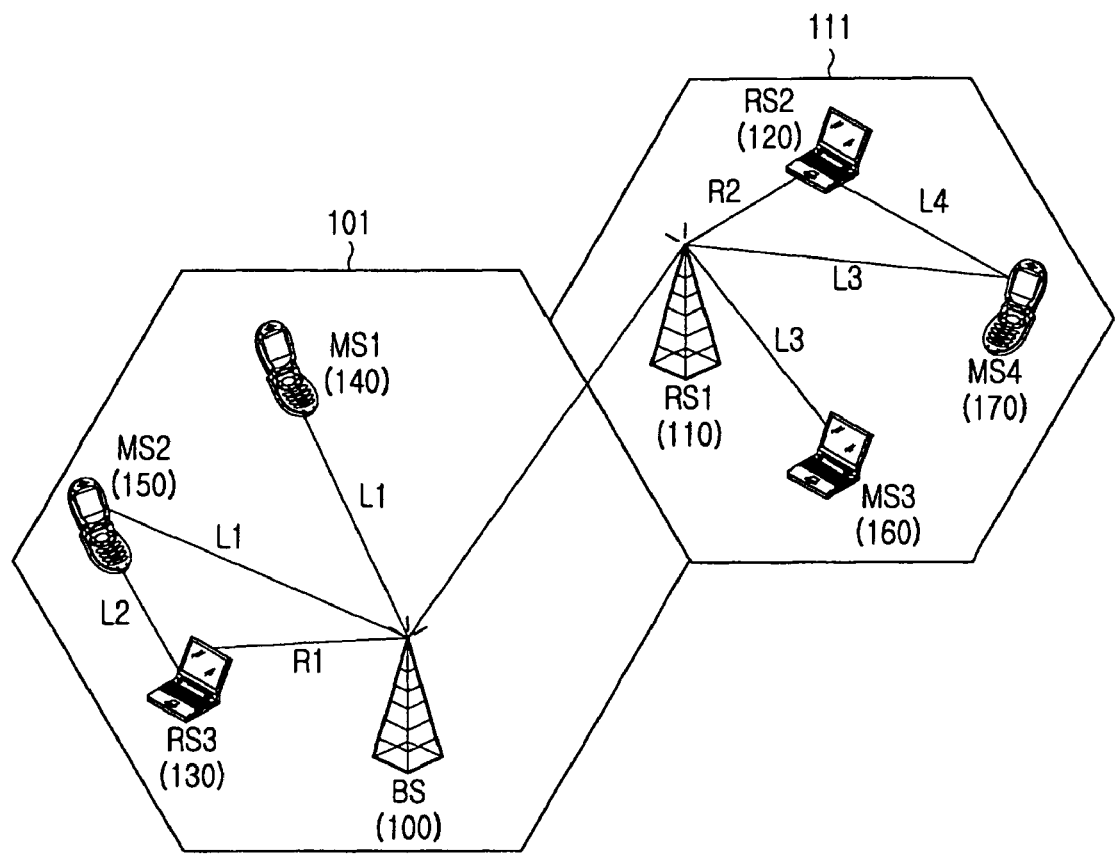
FIG. 1 illustrates the configuration of a conventional wireless communication system for providing a relay service.
Figure 2:
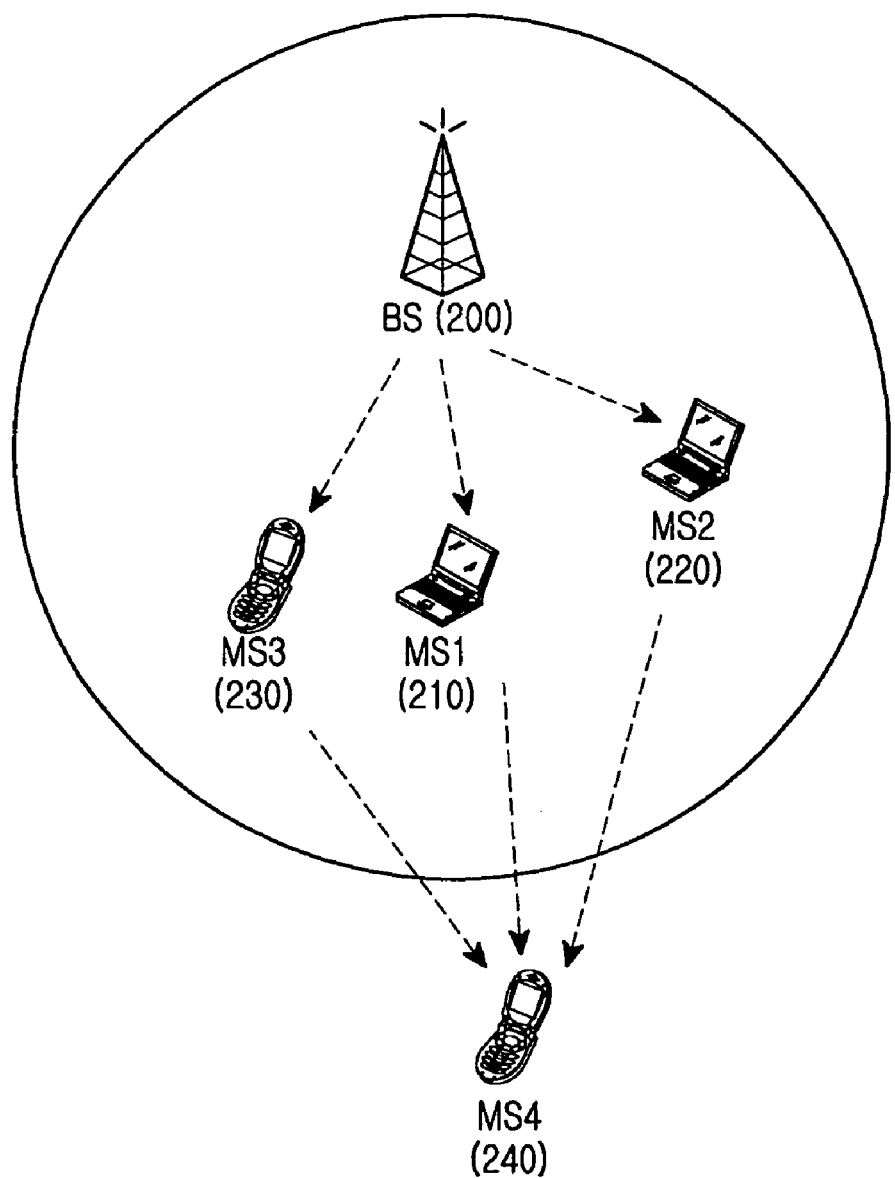
FIG. 2 illustrates the configuration of a wireless communication system for providing a relay service according to an exemplary embodiment of the present invention.

FIG. 2 illustrates the configuration of a wireless communication system for providing a relay service according to an exemplary embodiment of the present invention.

Referring to FIG. 2, the wireless communication system for providing a relay service includes MSs 210, 220, 230 and 240 (MS1, MS2, MS3 and MS4, respectively) and a serving BS 200 for providing a voice service or a packet data service to the MSs. Among the MSs, MS4 is located outside the cell area of the serving BS 200 and thus cannot receive a service from the service BS 200 using a direct link. MS4 should receive the service from the serving BS 200 by relaying from one of MS1, MS2 and MS3 having a relay function (hereinafter, referred to as relay MSs). For better understanding of the present invention, it is assumed that the serving BS 200 provides a communication service to a plurality of MSs in a centralized cellular communication system. Notably, the serving BS 200 can be any upper node of MSs.

While FIG. 2 shows only a case of relaying for expanding cell coverage, the same thing applies to relaying for increasing transmission capacity for a target MS within the same cell.

Figure 3:
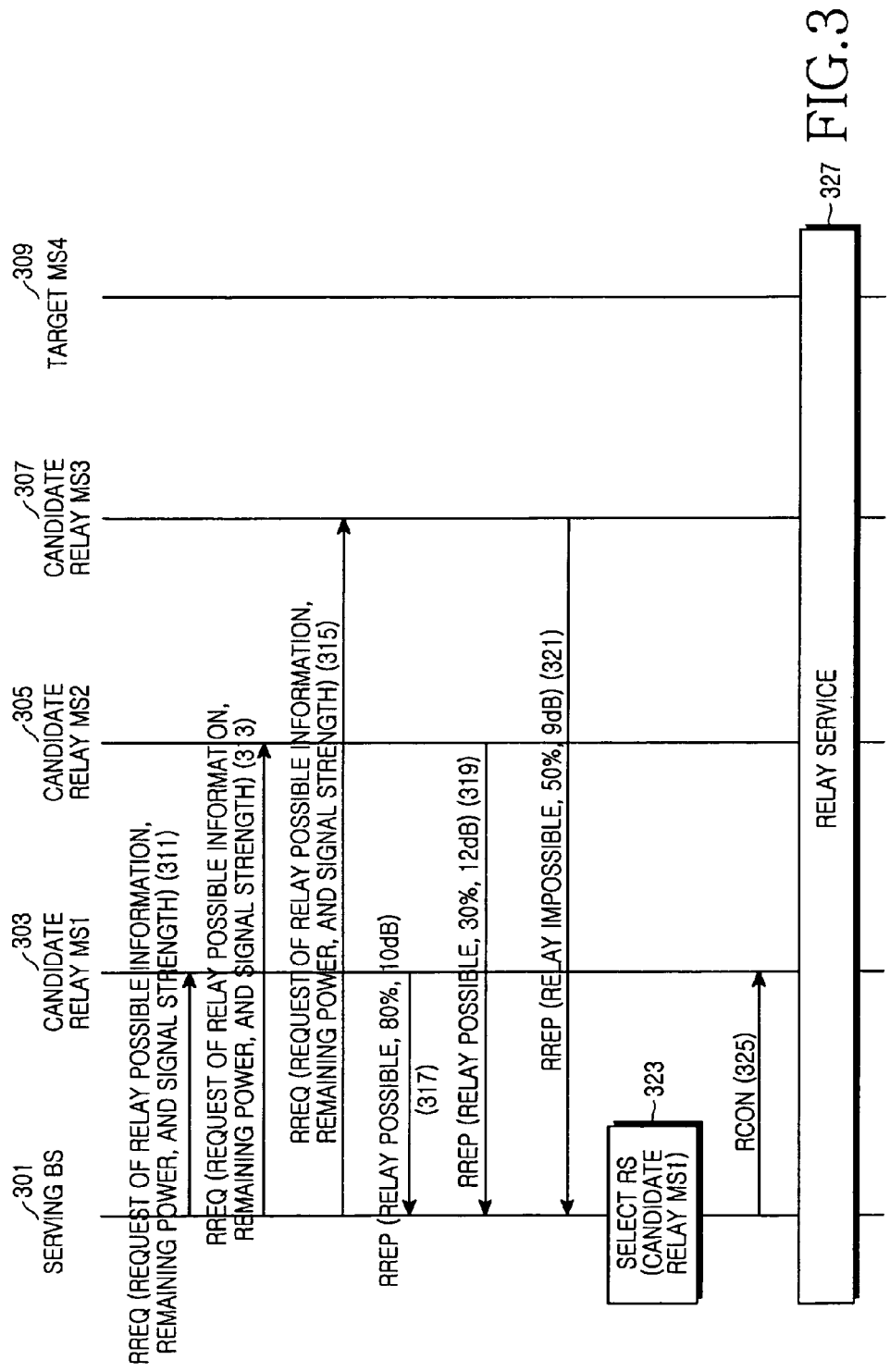
FIG. 3 is a diagram illustrating a signal flow for an operation between a serving BS and MSs according to an exemplary embodiment of the present invention.

FIG. 3 is a diagram illustrating a signal flow for an operation between a serving BS and MSs according to an exemplary embodiment of the present invention. In the illustrated case of FIG. 3, the operation is carried out among a serving BS 301, candidate relay MSs 303, 305 and 307 (candidate relay MS1, candidate relay MS2, and candidate relay MS3, respectively), and a target MS 309 (target MS4).

The serving BS 301 manages a candidate relay MS list of MSs capable of providing a relay function from among MSs within its cell area. As stated before with reference to FIG. 2, a service provider that operates the serving BS 301 acquires knowledge of whether each MS supports the relay function from the user of the MS.

Referring to FIG. 3, the serving BS 301 transmits a Relay REQuest (RREQ) message to a predetermined number of MSs 303, 305 and 307 among candidate relay MSs that it manages in steps 311, 312 and 315, respectively. Candidate relay MS1, candidate relay MS2, and candidate relay MS3 may exist on a communication path between the serving BS 301 and the target MS 309. Hence, MSs transmits their global positioning system (GPS)-based location information to the serving BS 301, periodically or non-periodically.

The RREQ message requests relay possible information, a remaining battery power, and a signal strength. The request of the relay possible information is for querying about support of the relay service of an MS according to a user selection in a real communication system even though the user of the MS has approved use of the MS as a relay. Therefore, even if a user agreed on use of his MS as a relay but does not want to use as a relay at a given time due to shortage of remaining power, a bad wireless communication environment, or other factors, the MS transmits a Relay REPly (RREP) message with relay possible information set to impossible to the serving BS 301. If the MS user cannot receive the RREQ message, the MS can automatically reply to the serving BS 301, taking into account its remaining power or its signal strength. The request of the remaining power by the RREQ message queries about the current remaining power of the relay MS. The remaining power can be expressed as an absolute power of the power that the MS preserves or a relative power value in percentage. The signal strength is the downlink signal strength of a reference signal such as a preamble or a pilot signal that the relay MS receives from the serving BS. The signal strength can be a signal-to-interference and noise ratio (SINR), a received signal strength indicator (RSSI), or a carrier-to-interference ratio (C/I).

Upon receipt of the RREQ message, candidate relay MS1, candidate relay MS2, and candidate relay MS3 transmit RREP messages each including relay possible information, remaining power information, and signal strength information to the serving BS 301 in steps 317, 319 and 321, respectively. For example, candidate relay MS1 transmits an RREP message with relay possible information set to possible, remaining power information set to 80%, and signal strength information set to 10 dB to the serving BS 301 in step 317. Candidate relay MS2 transmits an RREP message with relay possible information set to possible, remaining power information set to 30%, and signal strength information set to 12 dB to the serving BS 301 in step 319. Candidate relay MS3 transmits an RREP message with relay possible information set to impossible, remaining power information set to 50%, and signal strength information set to 9 dB to the serving BS 301 in step 321. The serving BS 301 selects a final relay MS based on a predetermined criterion. For instance, the serving BS 301 first excludes an MS that cannot support the relay function by setting relay possible information to impossible and then selects a candidate relay MS with the largest remaining power or the strongest signal strength depending on whether the determination criterion is remaining power or signal strength. Alternatively, the serving BS 301 can select a final relay MS in a comprehensive manner by weighting remaining powers and signal strengths. In the illustrated case of FIG. 3, the serving BS 301 first excludes candidate relay MS3 that answers negative as to relay possibility from the selection and finally selects candidate relay MS1 between candidate relay MS1 and candidate relay MS2 based on their remaining power in step 323.

Meanwhile, if a relay candidate MS is in charge mode in which there is no limit to its remaining power, it notifies the serving BS 301 of the charge mode by the RREP message. In the charge mode, the relay candidate MS is being charged. Upon receipt of information indicating the charge mode from the candidate relay MS, the serving BS 301 can give a higher priority to the charge mode than remaining power and signal strength in selection of a final candidate relay MS. Therefore, if a candidate relay MS is in the charge mode and can perform the relay function, the serving BS 301 selects the candidate relay MS as a final one.

Then the serving BS 301 transmits a Relay CONfirm (RCON) message to the selected MS 303, thereby notifying it that it will relay a signal in step 325. In step 327, the serving BS 301 can provide a communication service to the target MS 309 by relaying of the MS 303.

Figure 4:
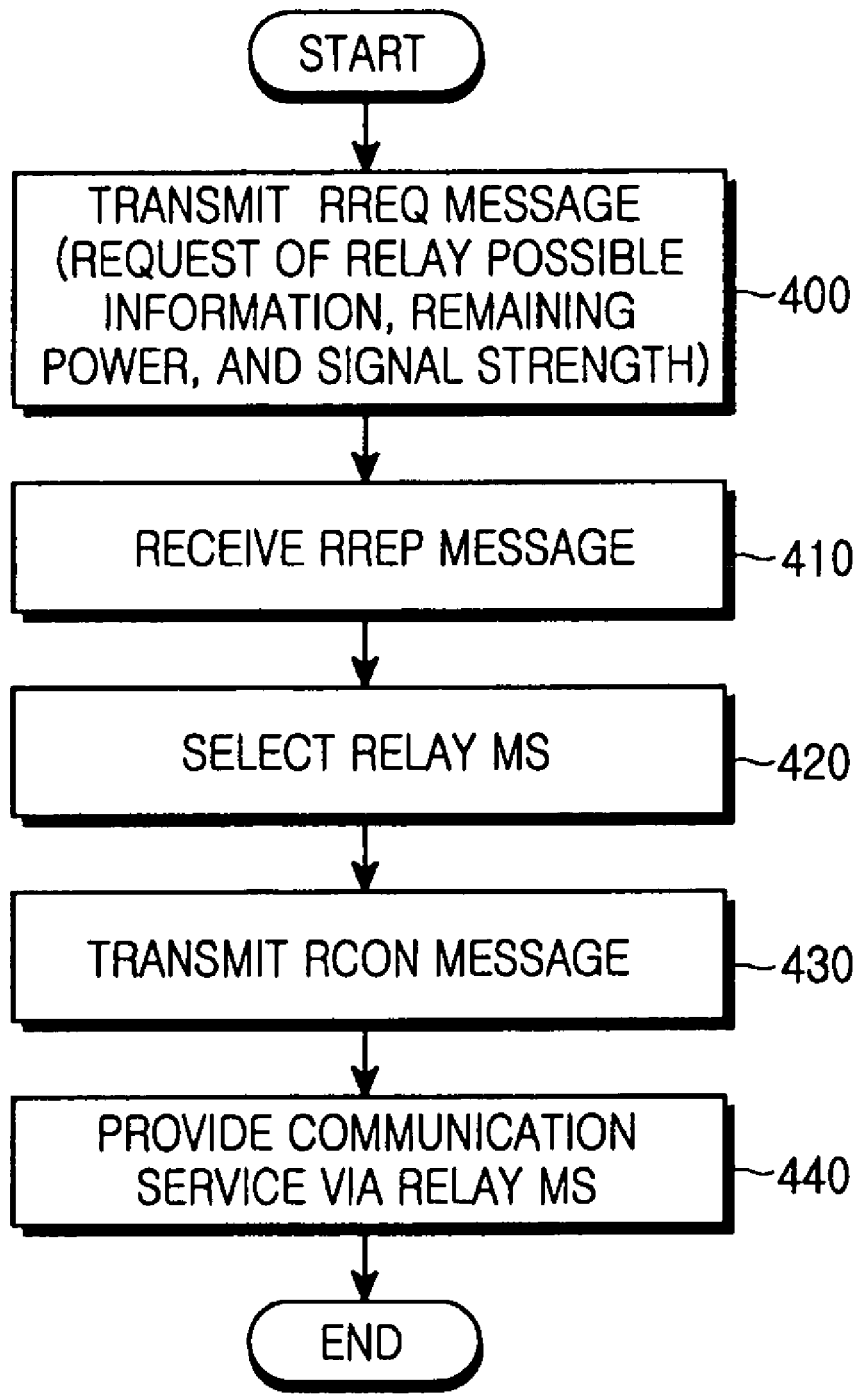
FIG. 4 is a flowchart illustrating an operation of the serving BS according to an exemplary embodiment of the present invention.

With reference to FIG. 4, an operation of the serving BS according to an exemplary embodiment of the present invention will be described. FIG. 4 is a flowchart illustrating an operation of the serving BS for providing a communication service to a target MS using a relay MS according to an exemplary embodiment of the present invention.

When the serving BS determines that a communication service needs to be provided using a relay MS, it transmits an RREQ message to candidate relay MSs in step 400. As described with reference to FIG. 3, the candidate relay MSs can be MSs that are located on a communication path between the serving BS 301 and a target MS among MSs that have agreed to the relay function with the service provider. For the relay function, the MSs report their GPS-based location information to the serving BS, periodically or non-periodically. Or the serving BS can select candidate relay MSs by roughly estimating the location of each MS based on the direction of angle (DoA) of an uplink signal received from the MS.

The RREQ message requests relay possible information, remaining powers, and signal strengths of the candidate relay MSs, as described before.

In step 410, the serving BS receives RREP messages from the candidate relay MSs. Information included in the RREP messages has been described before, and thus its description is avoided herein.

The serving BS selects a final relay MS according to a predetermined criterion using the information received in the RREP messages in step 420. The determination criterion has been described before with reference to FIG. 3, and thus its description will not be provided herein redundantly.

In step 430, the serving BS transmits an RCON message to the selected relay MS. Then the serving BS provides a communication service to the target MS using the relay MS in step 440.

Figure 5:
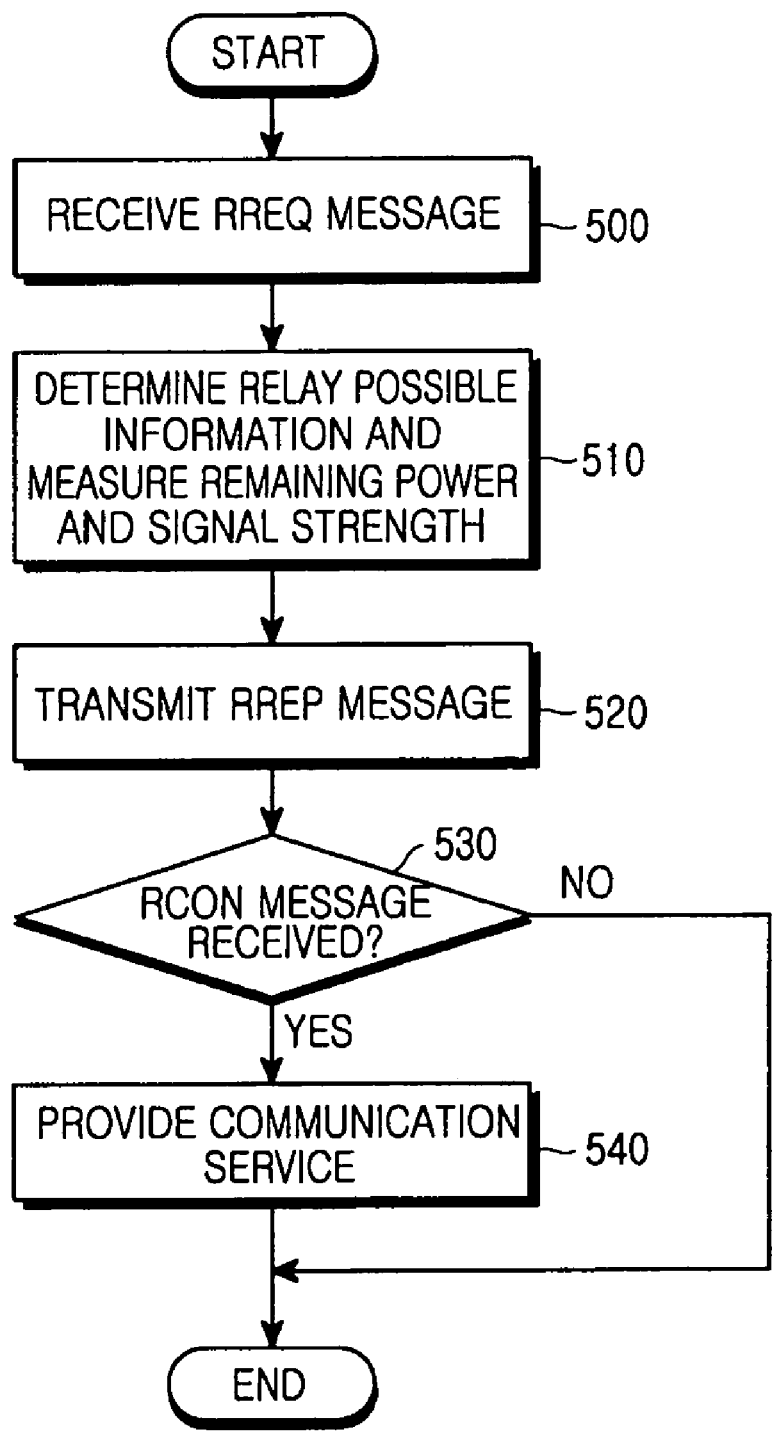
FIG. 5 is a flowchart illustrating an operation of a candidate relay MS according to an exemplary embodiment of the present invention.

FIG. 5 is a flowchart illustrating an operation of a candidate relay MS according to an exemplary embodiment of the present invention.

Referring to FIG. 5, the candidate relay MS receives an RREQ message from the serving BS in step 500. In step 510, the candidate relay MS determines whether to support the relay function and measures its remaining power and downlink signal strength. The decision whether to support the relay function can be made directly by the user of the candidate relay MS or according to a pre-stored decision criterion by the candidate relay MS. For example, in the absence of a direct input from the user, the candidate relay MS can determine whether to support the relay function based on its remaining power or downlink signal strength according to the decision criterion. The candidate relay MS may not receive an external input from the user for a period of time because the user is physically remote from the candidate relay MS or he cannot enter some input to the candidate relay MS for some reason.

The candidate relay MS can measure its remaining power in the percentage of a current remaining battery power to a full battery power or in an absolute value. For instance, the remaining power can be 30% or 10 mW.

The candidate relay MS measures the downlink signal strength by measuring the SINR, RSSI or C/I of a reference signal such as a preamble or a pilot signal received from the serving BS.

In step 520, the candidate relay MS transmits the determined relay possible information, remaining power information, and signal strength information to the serving BS by an RREP message. Then the candidate relay MS monitors reception of an RCON message in step 530. Upon receipt of the RCON message, the candidate relay MS relays communication data information to a target MS from the serving BS in step 540. If the candidate relay MS has not received the RCON message in step 530, the candidate relay MS does not perform the relay function.

As is apparent from the above description, the present invention advantageously selects a relay MS based on the channel conditions, remaining powers, and user intentions of candidate relay MSs in a communication system that should provide a relay service using a relay MS. Therefore, the relay service can be provided on a reasonable basis.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting and receiving a first signal by a first mobile station (MS) in a wireless communication system, comprising:
   transmitting location information of the first MS to a base station (BS), periodically or non-periodically;
   receiving a relay request message from the BS, if the first MS is included in candidate relay MSs according to the location information of the first MS;
   determining whether to perform a relay function, and transmitting a relay response message to the BS, the relay response message including first information indicating whether to perform the relay function of the first MS, second information about a remaining power of the first MS, third information about a strength of a second signal received from the BS, and fourth information indicating whether the first MS is in a charge mode; and
   relaying a third signal between the BS and a second MS, if a relay confirm message is received from the BS and if it is determined that the relay function is performed,
   wherein the first MS is different from the second MS, and
   wherein the first information is determined based on the second information and the third information.

2. The method of claim 1, wherein the third information includes one of a Signal-to-Interference and Noise Ratio (SINR), a Received Signal Strength Indicator (RSSI), and a Carrier-to-Interference Ratio (C/I), about a reference signal received from the BS.

3. The method of claim 1, wherein the second information and the third information are weighted using predetermined values.

4. The method of claim 1, wherein the fourth information indicates that the first MS is in the charge mode.

5. The method of claim 1, wherein the fourth information indicates that the first MS is not in the charge mode.

6. A method for transmitting and receiving a first signal by a base station (BS) in a wireless communication system, comprising:
   receiving location information from each of a plurality of mobile stations (MSs), periodically or non-periodically;
   transmitting a relay request message to first MSs capable of performing a relay function among the plurality of MSs based on the location information of each of the plurality of MSs;
   receiving a relay response message from each of the first MSs, the relay response message including at least one of first information indicating whether each of the first MSs can perform the relay function, second information about a remaining power of each of the first MSs, third information about a strength of a second signal received from the BS in each of the first MSs, and fourth information indicating whether each of the first MSs is in a charge mode;
   selecting a second MS from among the first MSs to perform the relay function using information included in the received relay response message;
   transmitting a relay confirm message configured to instruct performance of the relay function to the second MS; and
   transmitting and receiving third signals to and from a third MS among the plurality of MSs using the second MS, if it is determined that the relay function is performed in the second MS,
   wherein the first MS, the second MS, and the third MS are different MSs; and
   wherein the first information is determined based on the second information and the third information.

7. The method of claim 6, wherein the third information includes one of a Signal-to-Interference and Noise Ratio (SINR), a Received Signal Strength Indicator (RSSI), and a Carrier-to-Interference Ratio (C/I), about a reference signal received from the BS in each of the first MSs.

8. The method of claim 6, wherein transmitting the relay request message comprises:
   selecting the first MSs capable of performing the relay function located between the BS and the third MS using the received location information; and
   transmitting the relay request message to each of the first MSs.

9. The method of claim 8, wherein the third information includes one of a Signal-to-Interference and Noise Ratio (SINR), a Received Signal Strength Indicator (RSSI), and a Carrier-to-Interference Ratio (C/I), about a reference signal received from the BS in each of the first MSs.

10. The method of claim 6, wherein the second information and the third information are weighted using predetermined values.

11. A first mobile station (MS) for transmitting and receiving a first signal in a wireless communication system, comprising:
    a transmitter configured transmit location information of the first MS to a base station (BS), periodically or non-periodically;
    a receiver configured to receive a relay request message from the BS, if the first MS is included in candidate relay MSs according to the location information of the first MS;
    a controller configured to:
       determine whether to perform a relay function;
       control the transmitter to transmit a relay response message to the BS, the relay response message including first information indicating whether to perform the relay function of the first MS, second information about a remaining power of the first MS, third information about a strength of a second signal received from the BS, and fourth information indicating whether the first MS is in a charge mode; and
       relay a third signal between the BS and a second MS, if a relay confirm message is received from the BS and if it is determined that the relay function is performed,
    wherein the first MS is different from the second MS, and
    wherein the first information is determined based on the second information and the third information.

12. The first MS of claim 11, wherein the third information includes one of a Signal-to-Interference and Noise Ratio (SINR), a Received Signal Strength Indicator (RSSI), and a Carrier-to-Interference Ratio (C/I), about a reference signal received from the BS.

13. The first MS of claim 11, wherein the second information and the third information are weighted using predetermined values.

14. The first MS of claim 13, wherein the third information includes one of a Signal-to-Interference and Noise Ratio (SINR), a Received Signal Strength Indicator (RSSI), and a Carrier-to-Interference Ratio (C/I), about a reference signal received from the BS in each of the first MSs.

15. A base station (BS) for transmitting and receiving a first signal in a wireless communication system, comprising:
    a receiver configured to receive location information from each of a plurality of mobile stations (MSs), periodically or non-periodically;
    a transmitter configured to transmit a relay request message to first MSs capable of performing a relay function among the plurality of MSs based on location information of the plurality of MSs; and a controller configured to:

control the receiver to receive a relay response message from each of the first MSs, the relay response message including first relay possible information that includes information indicating whether each of the first MSs can perform the relay function, second information about a remaining power of each of the first MSs, third information about a strength of a second signal received from the BS in each of the first MSs, and fourth information indicating whether each of the first MSs is in a charge mode;

select a second MS from among the first MSs to perform the relay function using information included in the received relay response message;

control the transmitter to transmit a relay confirm message for instructing performance of the relay function to the second MS; and control the transmitter and receiver to transmit and receive third signals to and from a third MS among the plurality of MSs using the second MS, if it is determined that the relay function is performed in the second MS, wherein the first MS, the second MS, and the third MS are different MSs, and wherein the first information is determined based on the second information and the third information.

16. The BS of claim 15, wherein the third information includes one of a Signal-to-Interference and Noise Ratio (SINR), a Received Signal Strength Indicator (RSSI), and a Carrier-to-Interference Ratio (C/I), about a reference signal received from the BS in each of the first MSs.

17. The BS of claim 15, wherein the controller selects the first MSs capable of performing the relay function located between the BS and the third MS using the received location information, and controls the transmitter to transmit the relay request message to each of the first MSs.

18. The BS of claim 17, wherein the third information includes one of a Signal-to-Interference and Noise Ratio (SINR), a Received Signal Strength Indicator (RSSI), and a Carrier-to-Interference Ratio (C/I), about a reference signal received from the BS in each of the first MSs.

19. The BS of claim 15, wherein the second information and the third information are weighted using predetermined values.

* * * * *